United States Patent [19]

McEntire et al.

[11] 4,359,540
[45] Nov. 16, 1982

[54] METHOD FOR MAKING RIM ELASTOMERS USING A CATALYST SYSTEM WHICH IS A POLYMER CONTAINING TERTIARY AMINE MOIETIES

[75] Inventors: Edward E. McEntire; Richard J. G. Dominquez, both of Austin, Tex.

[73] Assignee: Texaco Inc., White Plains, N.Y.

[21] Appl. No.: 268,220

[22] Filed: May 29, 1981

[51] Int. Cl.³ ............................................. C08G 18/14
[52] U.S. Cl. .................................... 521/129; 525/131; 528/53
[58] Field of Search ....................... 521/129; 525/131; 528/53

[56] References Cited

U.S. PATENT DOCUMENTS

| 4,115,321 | 9/1978 | Sandner et al. | 521/115 |
| 4,143,003 | 3/1979 | Haas et al. | 521/129 |
| 4,184,023 | 1/1980 | Cuscurida | 521/129 |
| 4,218,543 | 8/1980 | Weber et al. | 521/128 |

*Primary Examiner*—Maurice J. Welsh
*Attorney, Agent, or Firm*—Jack H. Park; Kenneth R. Priem; David L. Mossman

[57] ABSTRACT

The invention is a method for making reaction injection molded polyurethane of improved properties. The method comprises injecting into a mold cavity a high molecular weight polyhydric polyether, a low molecular weight active hydrogen containing compound of at least two functionality, a polyisocyanate and a catalyst comprising polymers substantially without active hydrogens containing tertiary amine moieties. This catalyst results in improved paintability when using high solids paint. Reaction injection molded elastomers are useful as molded articles of commerce including, but not limited to, vehicle body parts.

18 Claims, No Drawings

METHOD FOR MAKING RIM ELASTOMERS USING A CATALYST SYSTEM WHICH IS A POLYMER CONTAINING TERTIARY AMINE MOIETIES

BACKGROUND OF THE INVENTION

1. Field of the Invention

The invention concerns the field of reaction injection molded polyurethanes.

2. Description of the Prior Art

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. These active hydrogen containing materials comprise a high molecular weight polyhydric polyether and a low molecular weight active hydrogen containing compound. After reaction and demolding, the parts may be subjected to an additional curing step which comprises placing the parts in an ambient temperature of about 250° F. or greater.

In a previously filed patent application, Ser. No. 136,199 filed Apr. 1, 1980 now U.S. Pat. No. 4,273,885, a catalyst system for RIM polyurethane elastomers was described which was comprised of dimorpholinodiethylether, dibutyltin dilaurate and an alkyl tin mercaptide. The catalyst combination in that patent application imparts superior processing characteristics to RIM polyurethane elastomer systems. However, we have since discovered that the use of dimorpholinodiethylether, while advantageous in many RIM systems, interferes in the cure of certain important paint systems known as high solids enamel paints. We have discovered that by substituting a reactive amine catalyst, which is tied up in the polymer network by reactions (see, for example, Applications Ser. Nos. 268,460, 268,528 and 268,459 filed of even date) that the processing benefits already described in the above mentioned patent application are retained and the RIM part can be painted using the high solids enamel paint systems.

In the present invention we have discovered that the use of polymeric amines as urethane catalysts provide the advantage of not interfering in the urethane network as do reactive amines. Also, they are not significantly incorporated into the polymer network since they are substantially free of active hydrogens. Thus these catalysts do not substantially interfere with the properties of the urethane polymer and do not migrate from the finished urethane product because of their high molecular weight, as is the case for low molecular weight unreactive amine catalysts.

The preparation of the catalyst used herein is the subject of our co-pending Application Ser. No. 268,531 filed of even date.

A general discussion of catalysis by soluble polymers is described in The British Polymer Journal, 12, 70 (1980) by D. C. Sherrington.

SUMMARY OF THE INVENTION

The invention is a method for making reaction injection molded polyurethane of improved processing characteristics and properties. The method comprises injecting into a mold cavity a high molecular weight polyhydric polyether (polyol), a low molecular weight active hydrogen containing compound of at least 2 functionality, a polyisocyanate and a catalyst comprising polymers containing tertiary amine moieties but substantially without active hydrogens. The invention is also the resulting RIM polyurethane composition.

DESCRIPTION OF THE PREFERRED EMBODIMENTS

In making RIM polyurethane elastomers, generally two streams are employed. The stream called the A-component consists primarily of the polyisocyanate and the stream called the B-component comprises the polyol, chain extenders, catalysts and other ingredients used to form the RIM elastomer. Although variations from this generalized procedure are acceptable in the preparation of RIM polyurethane products, this description is given for information only to define which ingredients are being discussed below and how they relate to the A- and B-components.

The polyols useful in the RIM elastomers of this invention include polyether polyols, polyester diols, triols, tetrols, etc., having an equivalent weight of at least 500, and preferably at least 1000 up to about 3000. Those polyether polyols based on trihydric initiators of about 4000 molecular weight and above are especially preferred. The polyethers may be prepared from lower alkylene oxides such as ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention.

The chain-extenders useful in this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. Other chain-extenders including cyclic diols such as 1,4-cyclohexane diol and ring containing diols such as bishydroxyethylhydroquinone, amide or ester containing diols or amino alcohols, aromatic diamines and aliphatic amines would also be suitable as chain-extenders in the practice of this invention.

The crosslinkers useful in this invention are those known in the art and have a functionality of about 3 or greater. These compounds include glycerine, trimethylolpropane, and 1,2,6-hexane triol. One skilled in the art will readily see other crosslinkers which would have value as needed.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

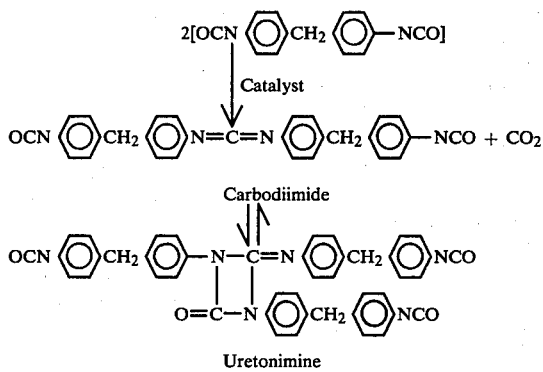

Examples of commercial materials of this type are Upjohn's ISONATE ® 125M (pure MDI) and ISONA-TE ® 143L ("liquid" MDI). Preferably the amount of isocyanates used is the stoichiometric amount based on all the ingredients in the formulation or greater than the stoichiometric amount.

It has been found that an improvement in processing characteristics of reaction injection molded (RIM) polyurethanes using a combination of ingredients chosen from those enumerated above may be had by employment of a particular catalyst.

Our catalysts are polymers containing tertiary amine moieties. In one general embodiment of our invention, the following monomers are polymerized to make the catalysts of our invention

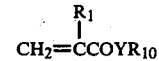

where $R_{10}$ is any tertiary amino containing group with a pka in water of 7.5 or greater. A more specific embodiment of this broad embodiment is:

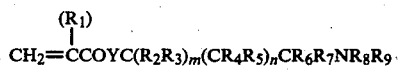

where Y=O, NH
$R_1$=H, $CH_3$
$R_2$-$R_7$ independently=H, $CH_3$, lower alkyl
m=0-1
n=0-6
$R_8$,$R_9$ independently=$CH_3$, lower alkyl; or together are cycloalkyl In a particularly preferred embodiment the monomer is N-(3-Dimethylaminopropyl)methacrylamide.

In another embodiment of our invention, polyvinyl pyridines may also be used as urethane catalysts. For example:

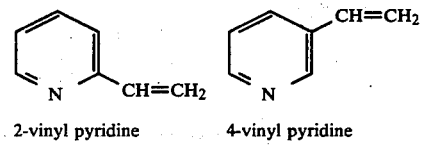

2-vinyl pyridine     4-vinyl pyridine may be polymerized to give poly(vinyl pyridines) which are useful as urethane catalysts. Substituted vinyl pyridines may also be used as monomers.

Co-polymers of the above mentioned amine containing monomers (acrylates, acrylamides and vinyl pyridines) with non-tertiary amine containing monomers are also useful as urethane catalysts. Co-monomers such as styrene, alkyl (meth)acrylates, acrylamide, alkyl(meth)acrylamides, olefins, diolefins such as butadiene, vinyl acetate, acrylonitrile, and essentially any other chemically unreactive vinyl monomers are suitable to form polymers which are urethane catalysts. The amounts of co-monomer may be from about 1 to about 90% by weight in the co-polymer. The amounts are governed by the desired polymer properties and by the monomer reactivity ratios.

The polymers may be preformed, then dissolved or suspended in one of the pre-urethane components (isocyanate, or polyol or chain extender), or the polymers may be formed in one of the two general components, preferably the B-component.

The tertiary amine containing monomers can also be polymerized in many other solvents such as water, alcohols, ketones, ethers, hydrocarbons, etc. To use the resulting polymers as catalysts for the formation of polyurethanes, the polymers must be then dissolved in one of the polyurethane precursor components, usually the B-component as mentioned above. Many solvents will interfere with the formation of polyurethanes so solvent removal from the amine containing polymer would be necessary prior to its use as a urethane catalyst.

To avoid the use of undesired solvents, urethane precursors or precursor components are preferably used as solvents for the preparation of the polymeric tertiary amine containing urethane catalyst described herein. Preferably, the polyol, crosslinker or chain extender to be used in the desired urethane formulation is selected for the polymerization solvent, thus avoiding the need to eliminate the solvent before use of the catalyst.

The tertiary amine containing polymers of our invention are free of active hydrogens but may have a small amount of grafted active hydrogens if formed in a liquid containing active hydrogens such as a polyol, crosslinker or chain extender. Thus, they are referred to as being substantially without active hydrogens.

The tertiary amine containing polymers are prepared by polymerization, preferably radical polymerization.

In a preferred embodiment of our invention, the tertiary amine polymer catalyst is used in a combination with other catalysts.

This combination comprises generally the polymer containing tertiary amine moieties, a fast gelatin organo tin catalyst and a delayed action gelation organo tin catalyst. A delayed action catalyst begins catalytic activity after a period of time has passed after mixing with the reactants. This particular combination of catalyst types results in valuable processing improvements including excellent flow properties in the mold, a minimum of surface defects due to shrinkage and excellent green strength. This has been difficult to achieve by prior art catalyst systems especially in the high flex modulus elastomers (80,000 psi and above). Although several amine and tin catalysts may be used in combination to perform the particular function sought here, it is particularly preferred that the polymer containing tertiary amine moieties be combined with the fast gelation tin catalyst, dibutyltin dilaurate and the delayed action gelation tin catalyst, an alkyltin mercaptide. This alkyltin mercaptide may preferably be a commercial product known as FOMREZ ® UL-29.

The RIM formulation includes a great number of other recognized ingredients such as additional crosslinkers, catalysts, extenders, blowing agents and the like. Blowing agents may include halogenated low-boiling hydrocarbons, such as trichloromonofluoromethane and methylene chloride, carbon dioxide, nitrogen, etc.

Other conventional formulation ingredients may also be employed, such as, for example, foam stabilizers, also known as silicone oils or emulsifiers. The foam stabilizer may be an organic silane or siloxane. For example, compounds may be used having the formula:

RSi[O—(R$_2$SiO)$_n$—(oxalkylene)$_m$R]$_3$ wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

In a preferred embodiment of this invention, a high molecular weight polyether polyurethane polyol of about 5000 molecular weight or above is combined with 4,4'-diphenylmethane diisocyanate (MDI) and allowed to react in the presence of a catalyst combination of a tertiary amine containing polymer dissolved in ethylene glycol, dibutyltin dilaurate and an alkyltin mercaptide in a standard RIM machine using known processing techniques. In an especially preferred embodiment of this invention the molded RIM part from just above is post cured at a temperature of about 325° F. for about one half of an hour. The invention may be exemplified by the following examples which are not intended to limit the scope of the invention.

A glossary of terms and materials used in the following examples follows the examples.

EXAMPLE I

To a polymerization kettle was charged 100 g N-(3-Dimethylaminopropyl)methacrylamide (DMAPMA) monomer and 0.5 g VAZO ® 52[1] (initiator). This was stirred magnetically until solution was achieved. Then 400 g of ethylene glycol was added. Nitrogen was bubbled through the solution for one hour while stirring, then a heating bath was raised to immerse the reactor. The solution was heated at 55° C. for 4.2 hours, and during this time a mild exotherm to 58° C. was observed.

Liquid chromatography[2] showed that 96.5% of the monomer was converted into polymer. The viscosity of a 0.5% active solution of the polymer in water was 1.5 cp as measured by a vibrating sphere viscometer.[3]
[1]VAZO ® 52-2,2'-azobis(2,4-dimethylvaleronitrile) [2]Reverse phase ion-pair method [3]Nameter Mod. 7.006PB viscometer

EXAMPLE II

DMAPMA (1500 g) and VAZO 52 (7.5 g) were combined and stirred until solution was achieved. Then 5000 g of ethylene glycol was added and the solution was purged with nitrogen for 1.5 hours. The sealed kettle was then heated as follows:

| 50° - 1 hour   | 60° - 1.5 hour |
|----------------|----------------|
| 55° - 1.5 hour | 65° - 0.5 hour |

The conversion was determined as above as 92%. A 3% active solution of polymer in ethylene glycol had a viscosity of 102 cp×d at 25° C. as measured by a vibrating viscometer[2].
[2]Reverse phase ion-pair method

EXAMPLE III

A preparation similar to Example II was made with the following ingredients:

| | |
|---|---|
| 1125 g | DMAPMA |
| 7.5 g | VAZO 52 |
| 3500 g | Ethylene glycol |
| 1.0 g | Ethylenediamine tetraacetic acid, |

| -continued |
|---|
| disodium salt, dihydrate |

Heating was conducted according to the following schedule:

| 50° C. - 3 hours | 60° C. - 2 hours |
|---|---|
| 55° C. - 2 hours | 80° C. - 1 hour |

Conversion was 96.7%.

The viscosity at 100° F. was 82,600 cs as measured by a capillary viscometer.

EXAMPLE IV

THANOL® SF-5505 (16 pbw), THANOL C-64 (5.83 pbw), dibutyltin dilaurate (0.015 pbw), FOMREZ® UL-29 (0.025 pbw) and polymeric amine/ethylene glycol master batch (1.00 pbw) were premixed and charged into the B-component working tank of an Accuratio VR-100 reaction injection molding machine. The material designated polymeric amine/ethylene glycol is a 20% by weight master batch of a high molecular weight polymer in ethylene glycol prepared as in Example II. Thus, 0.2 pbw of the polymeric amine catalyst and 0.8 pbw of ethylene glycol compose the 1.00 pbw of the master batch. ISONATE® 143L (29.83 pbw) and THANATE® L55-0 quasi prepolymer (5.78 pbw) were premixed and charged in the A-component working tank. The A-component temperature was adjusted to 80° F. and the B-component temperature was adjusted to 110° F. The machine was then calibrated to deliver the exact weight ratio described above which represents an isocyanate to hydroxyl equivalent ratio of 1.02. The ingredients were impingement mixed at about 2200 to 2300 psi impingement pressure on each stream and injected into a steel mold at 170° F. The mold is made to deliver plaques which are 18"×18"×⅛". A three second shot gave parts which have an overall density of about 64 pcf. Plaques of this material were postcured at 325° F. for 30 minutes and submitted for paintability studies. The materials were painted with high solids enamel paint systems.* The paint tests were favorable. When a similar system differing only in that the 0.2 pbw of polymeric amine catalyst is substituted by 0.25 pbw THANCAT® DMDEE, another amine catalyst, the resulting materials fail when tested for paintability by high solids enamel paint systems.

*Description of paint testing and results follow.

PAINT TESTING FOR RIM POLYURETHANE ELASTOMERS

A 4"×12"×⅛" sample of RIM polyurethane is first washed thoroughly to eliminate all the mold release on the surface. Even small amounts of mold release will interfere with the adhesion of the paint film to the substrate. After washing and drying, the samples are then painted. The paint systems most important in reinforced RIM are presently the so-called "high solids" enamel paints. When RIM elastomers containing THANCAT DMDEE, an unreactive tertiary amine catalyst, are painted with PPG's 430 high solids enamel paint system, interference with paint cure and adhesion failure are observed. When polymeric DMAPMA as described herein is used, the above mentioned problems do not occur.

GLOSSARY OF TERMS AND MATERIALS

RIM—Reaction Injection Molding.

Polyol—A di- or greater functionality high molecular weight alcohol terminated molecule composed of ether groups such as ethylene, propylene, butylene, etc., oxides.

MDI—4,4'-diphenylmethane diisocyanate.

ISONATE 143L—Pure MDI isocyanate modified so that it is a liquid at temperature where MDI crystallizes—product of the Upjohn Co.

THANOL SF-5505—A 5500 molecular weight polyether triol containing approximately 80% primary hydroxyl groups.

THANOL C-64—A blend of ethylene glycol and PLURONIC® F-98.

THANCAT DMDEE—Dimorpholinodiethylether.

FOMREZ UL-29—A stannic diester of a thiol acid (an alkyltin mercaptide). The exact composition is unknown. Product of Witco Chemical Co.

THANATE L55-0—A prepolymer of THANOL SF-5505 and ISONATE 143L.

DMAPMA—N-(3-Dimethylaminopropyl)methacrylamide.

We claim:

1. In a method for making a polyurethane elastomer of significantly improved properties wherein an aromatic polyisocyanate, a polyol of above about 500 equivalent weight, a chain extending agent comprising a low molecular weight active hydrogen containing compound of at least 2 functionality and a catalyst system is injected via a RIM machine into a mold cavity of the desired configuration the improvement which comprises using as a component of the catalyst system a polymer made from the monomer

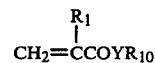

where $R_{10}$ is any tertiary amino containing group with a pka in water of 7.5 or greater, $R_1$ is H or $CH_3$ and Y is O or NH.

2. A method as in claim 1 wherein the polyol comprises a polyether of about 5000 molecular weight based on a trihydric initiator.

3. A method as in claim 1 wherein the polyisocyanate comprises 4,4'-diphenylmethane diisocyanate.

4. A method as in claim 1 wherein the elastomer is postcured at about 325° F.

5. A method as in claim 1 wherein the catalyst system also contains a fast gelation organo tin catalyst and a delayed action organo tin catalyst.

6. A method as in claim 5 wherein the fast gelation organo tin catalyst is dibutyltin dilaurate and the delayed action catalyst is an alkyltin mercaptide.

7. In a method for making a polyurethane elastomer of significantly improved properties wherein an aromatic polyisocyanate, a polyol of above about 500 equivalent weight, a chain extending agent comprising a low molecular weight active hydrogen containing compound of at least 2 functionality and a catalyst system is injected via a RIM machine into a mold cavity of the desired configuration the improvement which comprises using as a component of the catalyst system a polymer made from the monomer

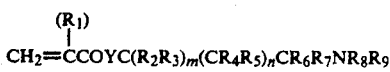

where
Y=O, NH
$R_1$ = H, $CH_3$
$R_2$-$R_7$ independently = H, $CH_3$, lower alkyl
m = 0-1
n = 0-6
$R_8$-$R_9$ independently = $CH_3$, lower alkyl; or together are cycloalkyl.

8. A method as in claim 7 wherein the polyol comprises a polyether of about 5000 molecular weight based on a trihydric initiator.

9. A method as in claim 7 wherein the polyisocyanate comprises 4,4'-diphenylmethane diisocyanate.

10. A method as in claim 7 wherein the elastomer is postcured at about 325° F.

11. A method as in claim 7 wherein the catalyst system also contains a fast gelation organo tin catalyst and a delayed action organo tin catalyst.

12. A method as in claim 11 wherein the fast gelation organo tin catalyst is dibutyltin dilaurate and the delayed action catalyst is an alkyltin mercaptide.

13. In a method for making a polyurethane elastomer of significantly improved properties wherein an aromatic polyisocyanate, a polyol of above about 500 equivalent weight, a chain extending agent comprising a low molecular weight active hydrogen containing compound of at least 2 functionality and a catalyst system is injected via a RIM machine into a mold cavity of the desired configuration the improvement which comprises
using as a component of the catalyst system a polymer made from N-(3-Dimethylaminopropyl)methacrylamide.

14. A method as in claim 13 wherein the polyol comprises a polyether of about 5000 molecular weight based on a trihydric initiator.

15. A method as in claim 13 wherein the polyisocyanate comprises 4,4'-diphenylmethane diisocyanate.

16. A method as in claim 13 wherein the elastomer is postcured at about 325° F.

17. A method as in claim 13 wherein the catalyst system also contains a fast gelation organo tin catalyst and a delayed action organo tin catalyst.

18. A method as in claim 17 wherein the fast gelation organo tin catalyst is dibutyltin dilaurate and the delayed action catalyst is an alkyltin mercaptide.

* * * * *